(12) United States Patent
Riggio

(10) Patent No.: US 8,751,527 B1
(45) Date of Patent: Jun. 10, 2014

(54) INFORMATION RETRIEVAL SYSTEM

(76) Inventor: Paul Riggio, New York, NY (US)

( * ) Notice: Subject to any disclaimer, the term of this patent is extended or adjusted under 35 U.S.C. 154(b) by 197 days.

(21) Appl. No.: 13/204,954

(22) Filed: Aug. 8, 2011

Related U.S. Application Data

(60) Provisional application No. 61/391,839, filed on Oct. 11, 2010.

(51) Int. Cl.
*G06F 17/30* (2006.01)

(52) U.S. Cl.
USPC .......................................... 707/770; 707/694

(58) Field of Classification Search
USPC ................................................. 707/770, 794
See application file for complete search history.

(56) References Cited

U.S. PATENT DOCUMENTS

| | | | |
|---|---|---|---|
| 5,616,876 A | 4/1997 | Cluts | |
| 5,918,223 A | 6/1999 | Blum et al. | |
| 6,240,423 B1 | 5/2001 | Hirata | |
| 6,545,209 B1 | 4/2003 | Flannery et al. | |
| 6,662,231 B1 | 12/2003 | Drosset et al. | |
| 6,735,628 B2 | 5/2004 | Eyal | |
| 7,028,082 B1 | 4/2006 | Rosenberg et al. | |
| 7,081,579 B2 | 7/2006 | Alcalde et al. | |
| 7,143,102 B2 | 11/2006 | Fiennes et al. | |
| 7,196,258 B2 | 3/2007 | Platt | |
| 7,358,434 B2 | 4/2008 | Plastina et al. | |
| 8,301,658 B2 * | 10/2012 | Chastagnol et al. | 707/783 |
| 2007/0044639 A1 * | 3/2007 | Farbood et al. | 84/609 |
| 2007/0174774 A1 * | 7/2007 | Lerman et al. | 715/723 |
| 2009/0228985 A1 * | 9/2009 | Maurer | 726/26 |
| 2010/0220197 A1 * | 9/2010 | Dukellis et al. | 348/207.1 |

* cited by examiner

*Primary Examiner* — Cindy Nguyen
(74) *Attorney, Agent, or Firm* — Goldstein Law Offices, P.C.

(57) ABSTRACT

A method of retrieving a file available for access via a network-implemented information retrieval system where the file includes audio content and has characteristics associated with the file and each characteristic having a variable level. The method includes setting the level of one of the characteristics for the file via a visual indicator of the level which indicates an increase or a decrease in the level by movement between a first points and a second point, a baseline located between the first point and the second point. The method also includes input, into the network-implemented retrieval system, a query including the set level. The method further includes receiving a query result including a reference to preview the file, the file is associated with an access condition; and previewing the file via selecting the reference.

19 Claims, 14 Drawing Sheets

| Category of Field | Field Name | Input Type and Description |
|---|---|---|
| Basic Track Info | Track ID | Numeric variable automatically generated by system. |
| | Track Title | String variable inputted by artist, collective, or music house. |
| | Part of Compilation | Binary variable tracking yes/no answer automatically generated by system after review of user data. |
| | Composer | String variable input by artist, collective, or music house. |
| Rights & License Information | Licenses Available for this Track and Cost of License | Binary variables accessed by artist, collective, or music house as multi-option check-box: {Exclusive/Non-exclusive/Buy out} with numeric variable accessed by artist, collective, or music house next to selection for price in U.S. Dollars. |
| | Status | Binary variables accessed by artist, collective, or music house via drop-down menu: {Unlicensed/Available; Unlicensed/Presentation; Unlicensed/Held by Client; Licensed}. |
| | Notes on Licensing this track | String variable inputted by artist, collective, or music house. |
| | Country | String variable accessed by artist, collective, or music house via drop-down menu {per list of 257 countries listed alphabetically} |
| Contracts | License Number | Numeric variable automatically generated by system when business user has filled-in all requested fields. Error code generated if all requested fields not completed. |
| | License Type | Binary variables accessed by artist, collective, or music house via a drop-down menu: {Mobile; Radio; TV; Motion Picture: Web; Game}. |
| | Contract | Adobe® .pdf file either uploaded by user of system, or selected from template created by web administrator. System has ability to upload and hold file and recorded with license number associated with it. |
| | Region | Numeric variable selected by artist, collective, or music house from drop-down list: {North America, South America, Europe, Africa, Asia, Australia & New Zealand}. |
| | Type | Numeric variable selected by artist, collective, or music house from drop-down list: {Exclusive, Non-exclusive, Buy-Out}. |

*Fig. 3B*

|  | Expiration Date | Date object inputted by artist, collective, or music house. |
|---|---|---|
| Creative Credits - Single | Name | String variable inputted by artist, collective, or music house. |
| Creative Credits - Multiple | Name and Role | Numeric variable selected by artist, collective, or music house from drop-down list: {Composer, Musician, Singer, Engineer, Producer, Sales Representative, Other}. |
|  | Notes | String variable inputted by artist, collective, or music house. |
| Media Renditions | Derivatives Available (Tracks) | Music file uploaded by artist, collective or music house maintained as .mp3, Master Media Asset, Flash® file, Master Media Asset; or low resolution MFJ. |
|  | Date Created | Date object inputted by artist, collective, or music house. |
|  | File Name | Alphanumeric file name automatically generated by system. |
|  | Original File Name | Alphanumeric file name read by system from file upload. |
|  | Fully Modifiable | Binary variable accessed by artist, collective, or music house tracking yes/no answer. |
|  | Splits Only | Binary variable accessed by artist, collective, or music house tracking yes/no answer. |
|  | Stereo File Only | Binary variable accessed by artist, collective, or music house tracking yes/no answer. |
| Descriptive Information | Genre | Numeric variable accessed by artist, collective, or music house uploading tracks via drop-down list. |
|  | Sub-Genre | Numeric variable accessed by artist, collective, or music house uploading tracks via drop-down list. |
|  | Sub-sub-genre | Numeric variable accessed by artist, collective, or music house uploading tracks via drop-down list. |
|  | Actual BPM | Numeric variable accessed by artist, collective, or music house. |
|  | Instrument | Numeric variable accessed by artist, collective or music house. See Exhibit 7B for further details. |

Fig. 3C

| | |
|---|---|
| Woodwinds | Piccolo |
| | Flutes |
| | Oboes |
| | English Horn |
| | Clarinet |
| | Bass Clarinet |
| | Bassoons |
| | Contrabassoon |
| Brass | Horn |
| | Trumpet |
| | Tenor Trombone |
| | Bass Trombone |
| | Tuba |
| | Euphonium |
| Percussion | Timpani |
| | Snare Drum |
| | Tenor Drum |
| | Bass Drum |
| | Cymbals |
| | Tam-tam |
| | Triangle |
| | Wood Block |
| | Tambourine |
| | Glockenspiel |
| | Xylophone |
| | Vibraphone |
| | Chimes |
| | Castanets |
| | Congas |
| | Bongos |
| | Güiro |
| | Whip |
| | Piano |
| | Celestra |
| | Harpsichord |
| Strings | Harp |
| | Violin |
| | Viola |
| | Violoncello |
| | Double Bass |

*Fig. 7B*

INFORMATION RETRIEVAL SYSTEM

CROSS-REFERENCE TO RELATED APPLICATIONS

This application claims priority to and benefit of U.S. Provisional Application No. 61/391,839, filed on Oct. 11, 2010, which is herein incorporated by reference in its entirety.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

TECHNICAL FIELD

The invention relates generally to a network-implemented information retrieval system. More particularly, the invention relates to a network-implemented information retrieval system, which allows one entity to upload an information file to a network server and another entity to retrieve the information file from the network server.

BACKGROUND

Generally, movie, television and videogame industries utilize music in "scoring" a scene. Scoring these works involves finding a music piece, which changes a mood of a scene in question, and playing the found music piece in a background while the movie, television or videogame scene proceeds. Similarly, other industries, such as advertising, and mobile phone software applications, rely upon music if the right music piece enhances an appeal of a proffered work-product. Thus, when an entity wants to use a certain music piece in its work-product, such as a commercial, the entity often faces a plurality of steps. For example, the entity must first search and select a desired music piece from a myriad of possibilities and then negotiate a copyright license terms with a copyright owner, such as a composer, a performer, a musical collective or a music house. Since numerous licensing possibilities exist, a situation sometimes arises where after a significant amount of effort is devoted to the selection of the right music piece, the music piece cannot be used because of high cost or other licensing issues.

Furthermore, although copyright owners are generally interested in licensing their copyrighted works, finding the right licensing opportunity is often a challenge. For example, low market recognition is one obstacle when seeking a lucrative licensing agreement because, generally, a small number of artists receive national exposure via popular recording labels. However, if a music piece receives public exposure through use in the movie, television, video game industries or in some other way, the public exposure could aid the copyright owner in gaining market recognition, which could eventually lead to other even more lucrative licensing deals.

While the foregoing may be suitable for the particular purpose employed, or for general use, they would not be as suitable for the purposes of the present invention as disclosed hereafter.

BRIEF SUMMARY

It is an object of an example embodiment of the invention to provide a technology for a network-implemented information retrieval system, which allows one entity to upload an information file to a network server and another entity to retrieve the information file from the network server, and auditioning of audio files.

An example embodiment of the invention includes a method of offering a file for access via a network-implemented information retrieval system. The file includes audio content and has characteristics associated with the file. Each characteristic has a variable level. The method includes setting the level of one of the characteristics for the file via a visual indicator of the level which indicates an increase or a decrease in the level by movement between a first points and a second point, a baseline located between the first point and the second point. The method also includes setting an access condition for the file. The method further includes offering the file for access via the network-implemented information retrieval system for subsequent retrieval according to the set level and the set access condition.

An example embodiment of the invention includes a method of retrieving a file available for access via a network-implemented information retrieval system. The file includes audio content and has characteristics associated with the file. Each characteristic has a variable level. The method includes setting the level of one of the characteristics for the file via a visual indicator of the level which indicates an increase or a decrease in the level by movement between a first points and a second point, a baseline located between the first point and the second point. The method also includes input, into the network-implemented retrieval system, a query including the set level. The method further includes receiving a query result including a reference to preview the file, the file is associated with an access condition. The method even further includes previewing the file via selecting the reference.

An example embodiment of the invention includes a computer-implemented method of facilitating file retrieval via a network-implemented information retrieval system. The method includes storing a first file on the network-implemented information retrieval system, wherein the first file includes first audio content, the first file has first file characteristics associated with the first file, each first file characteristic having a variable level, the first level is set via a visual indicator of the level which indicates an increase or a decrease in the level by movement between a first points and a second point, a baseline located between the first point and the second point and the first file is associated with an access condition for the file. The method also includes receiving a query including a second variable level of a second characteristic for a second file, the second level is set via a second visual indicator of the second level which indicates an increase or a decrease in the level by movement. The method further includes outputting a query result including a reference to the first file if the first level corresponds to the second level.

An example embodiment of the invention includes a computer-implemented method of auditioning an audio file with a video file in a network-implemented computing environment. The method includes storing the audio file and the video file in the network-implemented computing environment, the audio file has an access condition. The method also includes upon receiving a search query, outputting a search query result which includes the audio file. The method yet also includes receiving an audio time point instruction for outputting a stream of the audio file from an audio starting time point to an audio ending time point. The method further includes receiving a video time point instruction for outputting a stream of the video file from a video starting time point to a video ending time point. The method yet further includes outputting the stream of the audio file and the stream of the video file in accordance with the audio time point and the video time point.

To the accomplishment of at least one of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIGS. 3B and 3C are example diagrams of variables and objects used in maintaining metadata on tracks according to the present invention.

FIG. 7B is an example chart of a listing of different musical instruments displayed in an element of a post-search screen according to the present invention.

Figure 1:
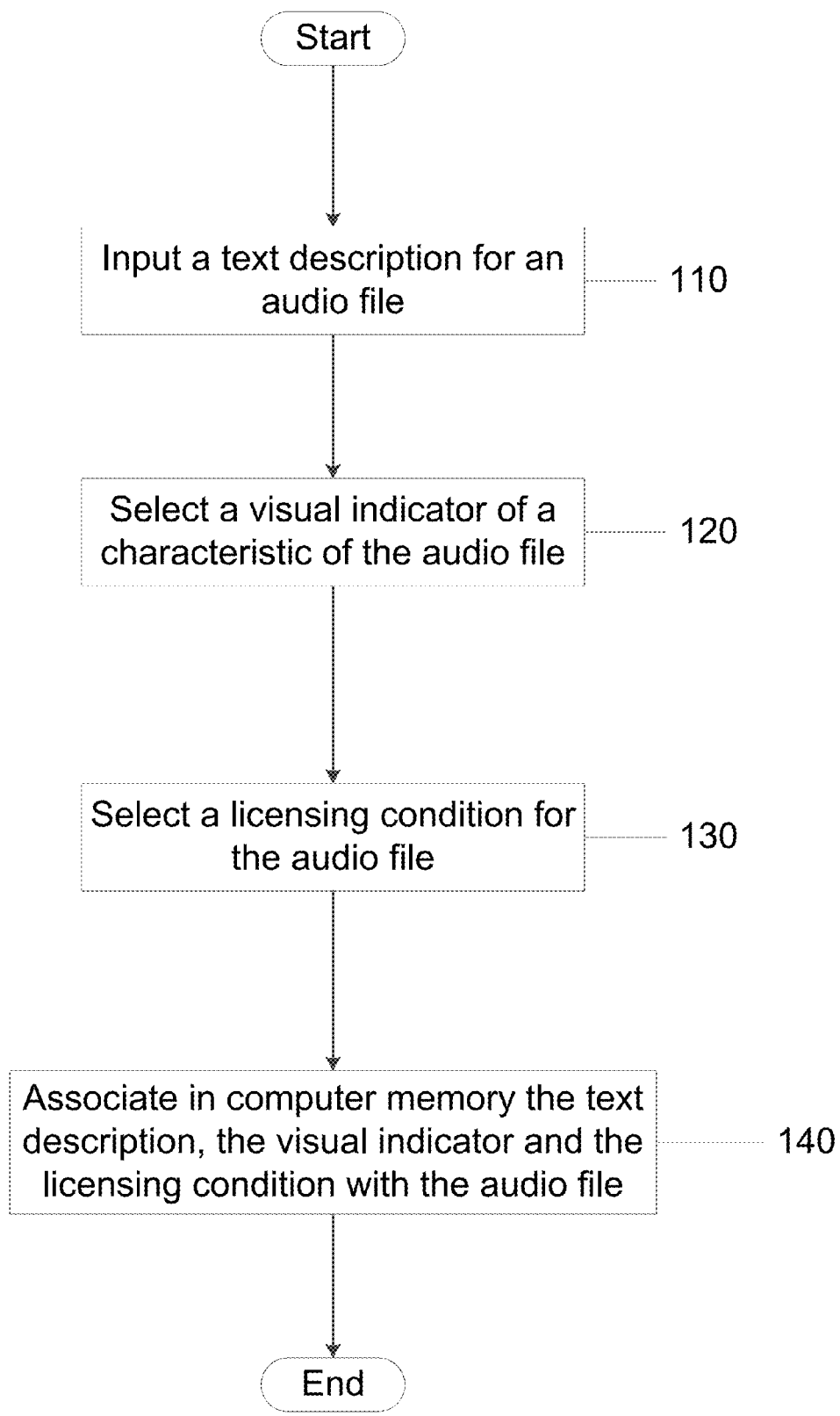
FIG. 1 is a flowchart of an example embodiment of a process for storing a track in computer memory according to the present invention.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION OF THE PREFERRED EMBODIMENTS

An embodiment of the invention offers a business user an opportunity to streamline and simplify some of the tasks associated with licensing a copyrighted work. The communication potential of the Internet coupled with the availability of easy ways to upload, store and retrieve the copyrighted work, allows the copyright owner to globally market the copyrighted work to the business user for licensing.

Furthermore, an embodiment of the invention offers a copyright owner an opportunity to offer the copyrighted work for license to a business user. The licensing generally produces a positive cash flow as well as an opportunity to gain greater market visibility, which often benefits the copyright owner in the long run. For example, when a copyright owner grants a copyright license for use in a well-known film or a television program, the copyright owner has an opportunity to increase its own public image or branding.

Moreover, an embodiment of the invention is an Internet-based music search and licensing engine, which allows a copyright owner to make its music available for licensing by a business user. For example, a copyright owner uploads a "track" (or clip of music) in an audio file format, such as MP3 or WAV, to a website, which is configured to allow sourcing, previewing and purchasing of licensing rights to the uploaded track. Subsequently, the track can be relatively easily located by the business user to satisfy its business need. Thus, the copyright owner and the business user benefit by having creative work available for license for whatever task is at hand. First, the copyright owner benefits by gaining public recognition of the copyrighted work, which is available to a wider audience over the Internet, and profiting immediately from its licensing. The copyright owner also benefits by having its branding reinforced when a creative work is licensed, thus making the remainder of the copyright owner's portfolio more attractive to the public. Second, the business user benefits from the ability to license a greater diversity of music for its needs from both better-known and lesser-known copyright owners.

Also, an embodiment of the invention allows a copyright owner to manage descriptive data and licensing conditions, such as an exclusive license, a non-exclusive license, work for hire or a buy-out, associated with the uploaded copyrighted track. Thus, the copyright owner merely has to click on one of the licensing options or price when the copyrighted track is uploaded and the system stores the choice as metadata.

Additionally, an embodiment of the invention allows a business user to preview and license a music track via a relatively simple, intuitive and appealing interface, which offers familiarity to those with experience in the music industry and is fun to use. Since music is not easy to describe verbally, a standard text search is not very effective. Thus, the interface includes a means for gradually selecting an increase or a decrease in a level of a certain category of the music track. One example of such means is a slider, which appears similar to a fader on a mixing console utilized in an audio studio. The slider similarly offers the copyright owner a classification scheme to facilitate track classification and the business user a relatively simple way to perform a search for tracks with certain characteristics. Also, since the characteristic each slider represents is generally subjective, a "baseline" song may be offered with each slider in order to indicate a middle point between the two extremes and thus aid in classification or search. For example, the slider may represent a characteristic of a track sought by the business user. Some of the characteristics may be whether the desired track should be fast or slow, bright or dark, edgy or clean. Accordingly, the interface allows the copyright owner to classify or "tag" the copyrighted work as metadata before or after the copyrighted work is uploaded to the website and the same slider is then utilized by the business user when performing the music search. Thus, a match is made when the business user's selection corresponds to the classification/tag made by the copyright owner.

Furthermore, an embodiment of the invention allows a copyright owner to reinforce its brand by offering a license for an uploaded copyrighted track. Thus, if a particular uploaded track offered for license proved popular and was publicly traced to the copyright owner, then the copyright owner has a better chance of further licensing its music to others.

Moreover, an embodiment of the invention allows a business user to save a selected track for subsequent use. Since a user profile associated with a unique login and password for each business user is used, the selected track can be saved in the profile. Further, components of the user profile can be communicated to other business users who review the choice of tracks and privilege can be granted to other members to access and review the contents of the profile. Thus, if the business user expends significant effort in selecting which tracks are going to be licensed, but does not actually license the tracks at the time when the tracks are selected, the business user can save the selected tracks for subsequent use and allow others to view the saved selections.

Also, an embodiment of the invention allows a business user to upload a visual content file, such as a movie scene, a television clip or at least a portion of a videogame, and play the file, while "auditioning" possible tracks to license. The auditioning streamlines the licensing process and allows the business user to make a relatively fast and simple decision on which track(s) is the most appropriate to be used as background music for the file.

Additionally, an embodiment of the invention allows a business user to collaborate with a colleague in selecting a track to license. The collaboration is performed via sharing access to a list of tracks, which were selected as candidates for licensing. Each business user who receives access to the list may modify the contents of the list eventually leading to a final selection. The list may also include a search result with certain tracks flagged for review.

FIG. 1 is a flowchart of an example embodiment of a process for storing a track in computer memory according to the present invention. Process includes blocks 110-140.

In block 110, the copyright owner inputs a text description for an audio file. More particularly, the copyright owner accesses a network-implemented information retrieval, such as an Internet-based music search and licensing engine. The system is hosted on a server and the copyright owner may remotely access the system. Upon accessing the system, such as via inputting a unique login and password, the copyright owner selects and uploads the audio file, such as a music file, which the copyright owner plans to license. Alternatively, the copyright owner may upload the audio file after performance of block 130. The audio file may be encoded with an audio encoding, such as MP3, WMI or WAV format.

Irrespective of the uploading of the audio file, in order to textually describe the audio file, the copyright owner inputs the text description of the audio file into the system. The text description enables the copyright owner to textually describe a sound of the audio file or an emotional mood evoked when the audio file is heard. Alternatively, the description may be a picture corresponding to the sound or the emotional mood, such as a turtle to a slow tune or a jack-o-lantern to a spooky mood.

In block 120, the copyright owner selects a visual indicator of a characteristic of the audio file. More particularly, the copyright owner uses a graphical user interface (GUI), which includes a means for gradually selecting an increase or a decrease in a level of a certain category of the audio file, to select a visual indicator of a characteristic of the audio file. In an example embodiment, the level is indicated alphanumerically, color, intensity of color or via figure. One example of such means is a knob, which appears similar to a volume knob on a stereo. While a knob shape may be circular, the knob can be of any shape, such as a triangle, a rectangle, a square, a linear strip, a pentagon or a trapezoid, as long as the shape facilitates a rotation of the knob on its own axis in order to select a setting. Another example of such means is an increase element and a corresponding decrease element, both of which include a button which, upon clicking, correspondingly increases or decreases a level of a category. Yet another example embodiment of such means is a slider, which appears similar to a fader on a mixing console utilized in an audio studio.

In an example embodiment, the slider offers the copyright owner a classification scheme to facilitate track classification. Thus, if using the GUI with a plurality of sliders where each slider represents a characteristic of the track, the copyright owner adjusts a setting on each slider to a position, which in the copyright owner's view, best corresponds to a classification of the audio file. Alternatively, the system may include audio sound recognition software to automatically classify the audio file according to a set of rules and position a setting on a slider accordingly. The copyright owner may subsequently adjust, via a slider, the automatic classification of the audio file to a position, which in the copyright owner's view, better corresponds to a classification of the audio file.

In block 130, the copyright owner selects an access condition, such as a licensing condition, for the audio file. More particularly, the copyright owner is shown a plurality of selectable elements, each of which corresponds to the licensing condition, such as an exclusive license or a non-exclusive license, of the audio file. Upon displaying of the elements, the copyright owner selects the desired element. Often, element selection is based on a subjective assessment of the marketability of the audio file.

In block 140, the copyright owner associates in computer memory the text description, the visual indicator and the licensing condition with the audio file. More particularly, after blocks 110-130 have been performed, the copyright owner is shown a review screen, which allows the copyright owner to review the text description, the visual indicator and the licensing condition of the audio file.

If no mistakes are detected or the copyright owner does not desire to modify the text description, the visual indicator or the licensing condition of the audio file, then the review screen allows the copyright owner to associate in computer memory the text description, the visual indicator and the licensing condition of the audio file with the audio file itself. The copyright owner performs the association via selecting and clicking a GUI display element corresponding to initiating the association, which is performed via a database which stores, in memory of a server, the audio files and the audio files associations. One example of such display element is a button associated with a submit label. Upon clicking, the button associates in computer memory the text description, the visual indicator and the licensing condition of the audio file with the audio file itself.

If a mistake is detected or the copyright owner desires to modify the text description, the visual indicator or the licensing condition of the audio file, then the review screen may allow instant modification of the text description, the visual indicator or the licensing condition of the audio file. However, alternatively, upon a detection of a mistake or a desire to modify the text description, the visual indicator or the licensing condition of the audio file, the review screen may display a link to a modification screen in order to allow the copyright owner to modify the text description, the visual indicator or the licensing condition of the audio file. The modification screen displays a link to the review screen.

Upon association in computer memory of the text description, the visual indicator and the licensing condition of the audio file with the audio file itself, the audio file becomes available to a business user for reviewing, licensing and downloading. In an example embodiment, associating may include submitting for charging payment account data, such as credit card data, or consenting to payment processing of an account associated with stored payment account data.

Figure 2:
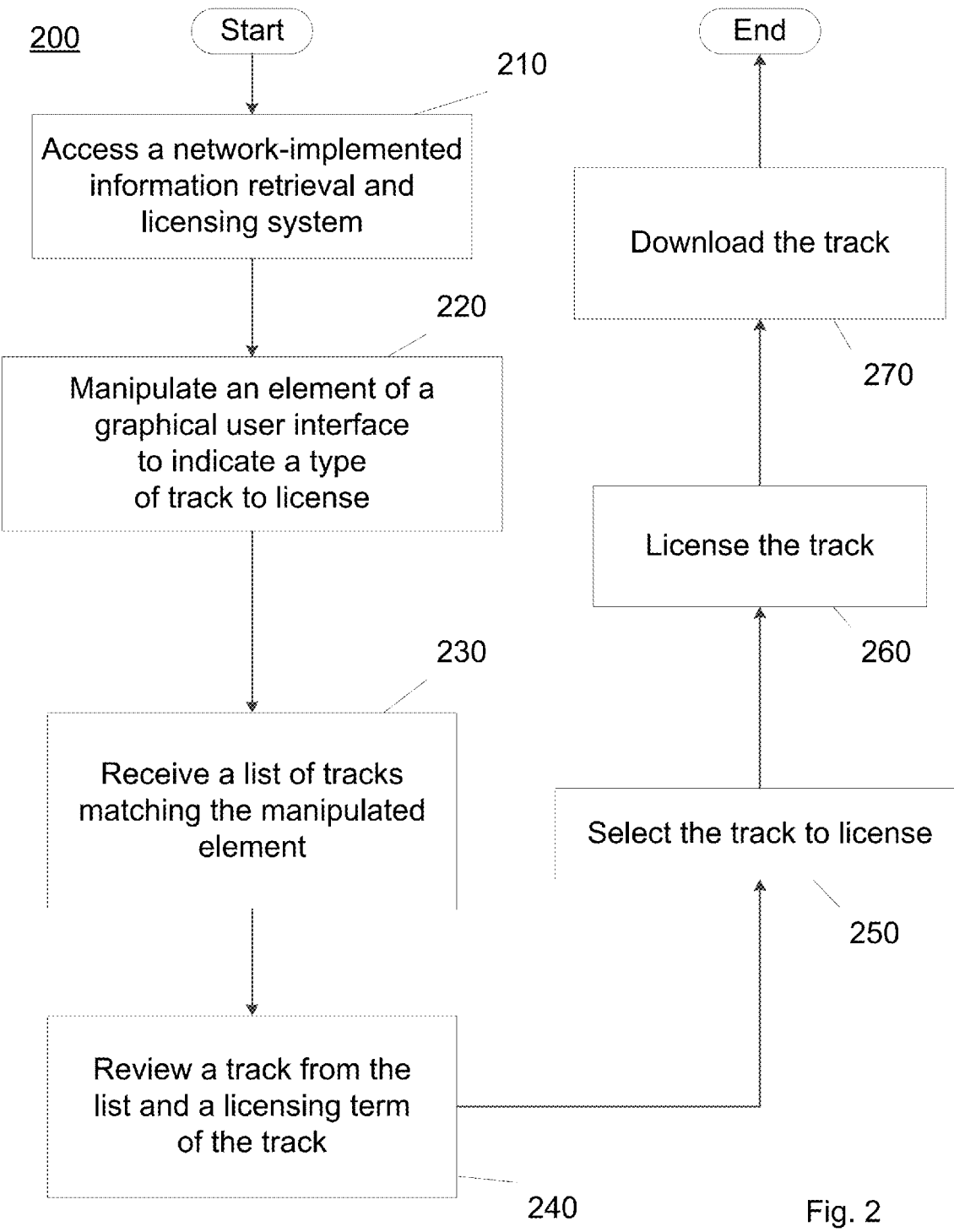
FIG. 2 is a flowchart of an example embodiment of a process for licensing a track according to the present invention.

FIG. 2 is a flowchart of an example embodiment of a process for licensing a track according to the present invention. Process includes blocks 210-270.

In block 210 a business user accesses a network-implemented information retrieval, such as an Internet-based music search and licensing engine. More particularly, the access is performed via inputting a unique username, such as an email address, and a corresponding password. If the input username and password match a previously stored username and password, then access to the system is granted.

In block 220, the business user adjusts an element of a GUI to indicate a type of a track to license. More particularly, one example of such element is a slider, as described above. The business user uses the slider, as a search term, to select an increase or a decrease in a level of a certain category, to locate a track matching the slider setting as set by a copyright owner. For example, the slider may represent whether the track has a fast or a slow beat. Upon conclusion of the adjustment, the business user submits the selection to the system.

In block 230, the business user receives a list of tracks matching the adjusted element. More particularly, the list can be displayed on a display visible to the business user and the list can be sortable, such as alphabetically or by date or by a licensing term.

In block 240, the business user reviews a track from the list and a licensing term of the track. More particularly, the business user can review the track and the licensing term by listening to the track and reviewing the licensing term in order to determine if the track and the licensing term satisfy a certain business need and budget. If the list includes a plurality of tracks, then the business user can sequentially or randomly listen to the tracks or manually select a track from the list and listen to the selected track. Generally, tracks are previewed live as streaming audio so as to avoid piracy of the music. The business user can review the licensing term of the track by reading a licensing condition for the audio file as set by the copyright owner. The licensing term is visually associated with the corresponding track. Thus, for example, if the list includes a plurality of tracks and the business user is automatically sequentially listening to the tracks, then the licensing terms, for the track currently being listened to, may appear in a pop-up window or within main window.

In an example embodiment, the review of the track is performed via a track audition. For example, a business user uploads a visual content file, such as a movie scene, a television clip or at least a portion of a videogame, and plays the visual content file, while listening to a selected track. The visual content can be viewed in a full screen mode. The auditioning streamlines the licensing process and allows the business user to make a relatively fast and simple decision on which track(s) is the most appropriate to be used as background music for the file.

In block 250, the business user selects the track to license. More particularly, upon identifying the track that satisfies the certain business need and the budget, the business user selects the track to license. The selection is made as known in the art. For example, the selection is made can be processed via a "shopping cart" online purchasing technology.

In block 260, the business user licenses the track. More particularly, the business user pays for the track by inputting or using a previously stored payment account data, such as credit card data or debit card data. Alternatively, the business user can license the track without paying for the track if the license term of the track has been enabled as such by the copyright owner.

In block 270, the business user downloads the track. More particularly, upon conclusion of license processing, the business user can download the track in an audio file format, as selected by the business user. Some examples of an audio file format include MP3, WAV or WMA.

Figure 3A:
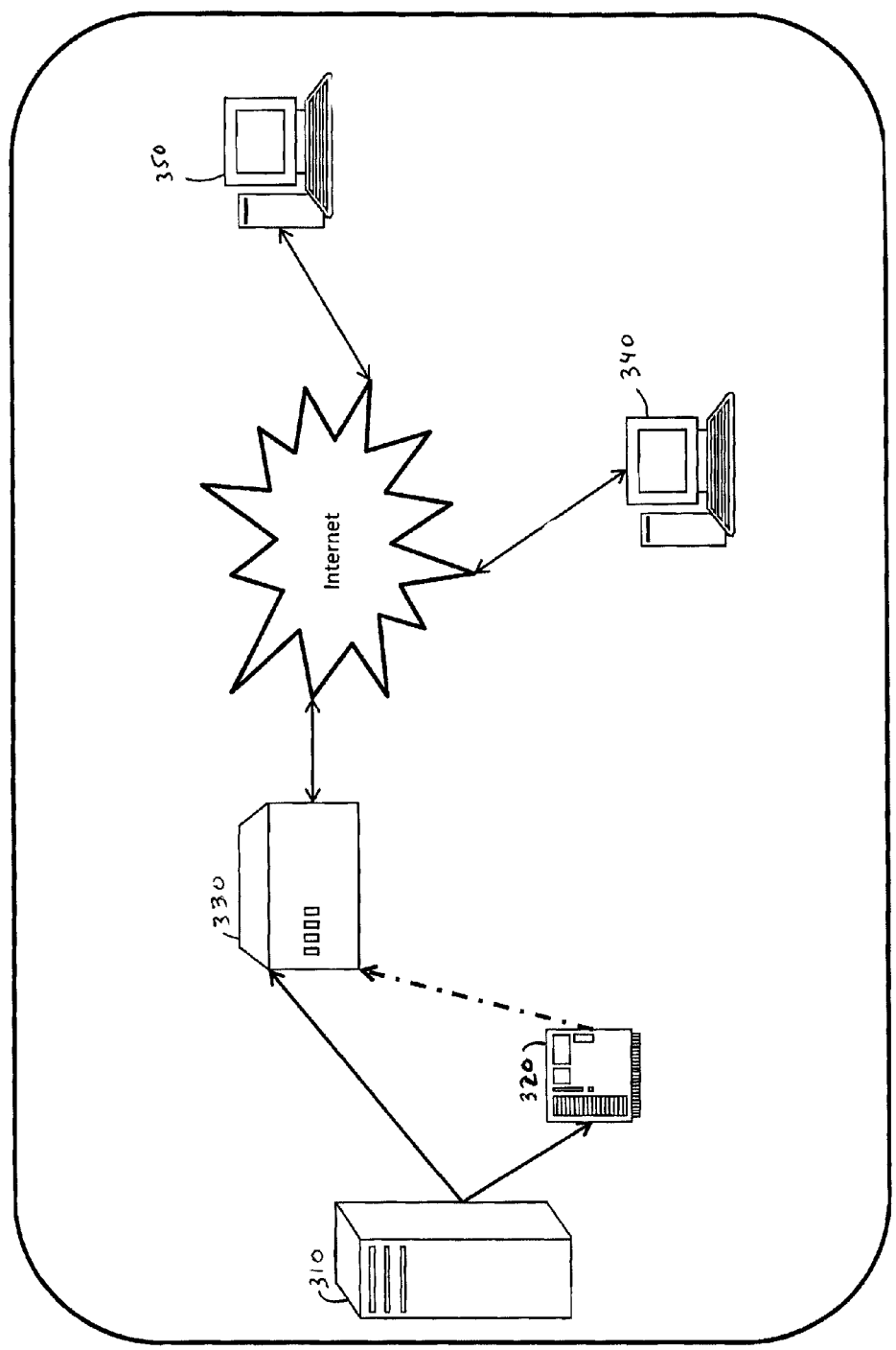
FIG. 3A is a schematic diagram of an example network architecture according to the present invention.

FIG. 3A is a schematic diagram of an example network architecture according to the present invention. Network architecture 300 includes a database 310, an encoder 320, a server 330, a copyright owner computer 340 and a business user computer 350.

Server 330, copyright owner computer 340 and business owner computer are coupled to a network, such as Internet.

Database 310 is coupled to encoder 320 and server 330. Database 310 stores a computer code for a GUI, which a business user sees displayed on business user computer 350 when a business user accesses server 330 via a network. Database 310 stores tracks and corresponding metadata, which were uploaded by a copyright owner for licensing to the business user. In an example embodiment, tracks are stored in an MP3 format and metadata includes information associated with the track, such as track name and licensing conditions associated with the track.

In one mode of operation, first, the copyright owner classifies and uploads a track from copyright owner computer 340 to database 310 via server 330. Second, the business owner connects from business user computer 350 to server 330 and selects a track to preview. Third, upon database 310 receiving the business user's preview request, database 310 sends the stored track to encoder 320, which encodes the track for streaming. Fourth, the audio stream is transmitted via web server 330 to business user computer 350. Fifth, if the business user decides to license the streamed track, then upon successful license processing, database 310 allows business user computer 350 to download the track in a file format, as the business user selects.

FIGS. 3B and 3C are example diagrams of variables and objects used in maintaining metadata on tracks according to the present invention. The metadata may include variables, such as a category of field, and objects, such as a field name, used in maintaining metadata on stored tracks. Also shown in FIGS. 3B and 3C are input types and description of the input type.

Figure 4:
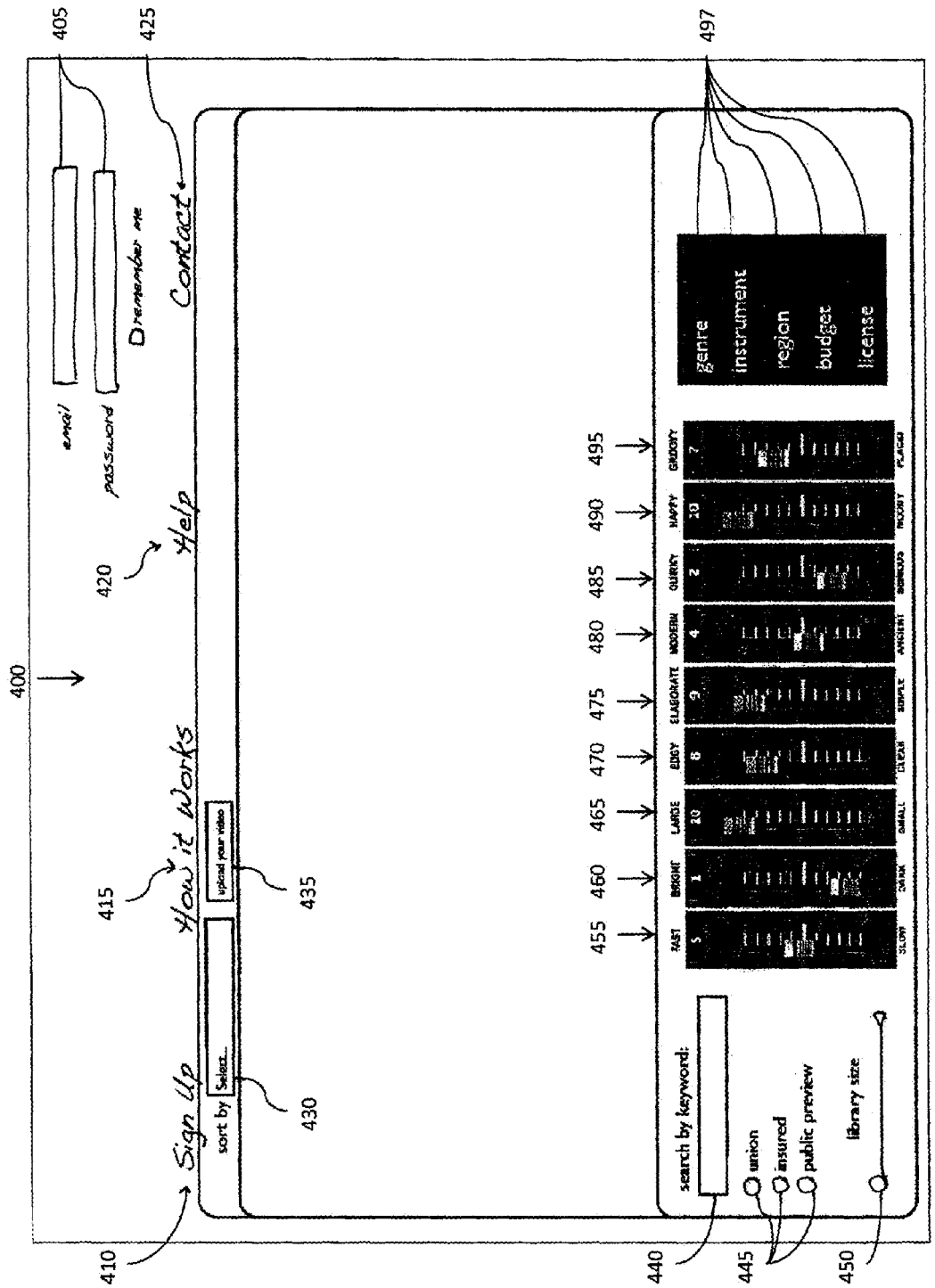
FIG. 4 is an example screenshot of a pre-search screen and sliders according to the present invention.

FIG. 4 is an example screenshot of a pre-search screen and sliders according to the present invention. Screen 400 displays visual elements 405-497.

Element 405 is a login element, which allows a business user to login by inputting an email address and a password into corresponding text fields. Element 405 may also include a "remember me" checkbox, which, if checked, utilizes cookie technology to store, on the checking computer, information associated with at least the input email address. Upon logging in, the business user may be shown corresponding account information.

Element 410 is a signup element, which, upon clicking, displays a signup screen.

Element 415 is an informational element, which, upon clicking, displays information generally describing how an embodiment of the invention operates.

Element 420 is a help element, which, upon clicking, displays help information.

Element 425 is a contact element, which, upon clicking, displays contact information of a site administrator.

Element 430 is a sorting element, which, upon clicking, displays a dropdown menu and enables sorting, according to a criterion, of displayed information, such as a search result. For example, sorting may be by name, title of the audio file or cost of licensing.

Element 435 is a video upload element, which, upon clicking, begins upload process of a video clip selected by the business user.

Element 440 is a keyword search element, which, upon textual input, searches for uploaded tracks by keyword, such as a band name.

Element 445 is a filtering category element, which, upon clicking, categorically filters displayed results. For example, categorical filtering may be according to whether a copyright owner is part of a musician union, whether the copyright owner is insured or whether a public preview is available.

Element 450 is a size filtering element, which, upon adjustment, filters a displayed search result by how many tracks are in an album of the copyright owner.

Sliders 455-495 allow the business user to seek, via adjusting a slider, audio which is fast or slow (slider 455), bright or dark (slider 460), large or small (slider 465), edgy or clean (slider 470), elaborate or simple (slider 475), modern or ancient (slider 480), quirky or serious (slider 485), happy or moody (slider 490) and groovy or placid (slider 495).

In an example embodiment, sliders 455-495 may include a numeral indication label which dynamically changes to display a numeral corresponding to a level of category selection. For example, if a setting on a slider is adjusted to a highest category, then the label displays 10 and if a setting on the slider is adjusted to a lowest category, then the label displays 1.

In another example embodiment, sliders 455-495 include a baseline approximately midway through a slider path of sliders 455-495 and five slider path positions above baseline and five slider path positions below baseline. Each position, from bottom of the slider path to the top of the slider path, is numbered from 1-10. Each position on the slider path indicates a rating of a characteristic of the selected audio track. The ratings are stored as metadata associated with the audio track.

Element 497 are filters, which allow a business user to select and sort tracks by a genre, an instrument used in making the track, a geographic region the tracks are from and a license available.

In one mode of operation, a business user adjusting sliders 455-495 will request an audio track at least based on traits corresponding to selected settings on sliders 455-495. In response, the business will receive a list of audio tracks, such as tunes or songs, responsive to the request. The list is based on previously saved metadata, which describes how the copyright owner rated the audio track when the copyright owner uploaded the audio track.

Figure 5:
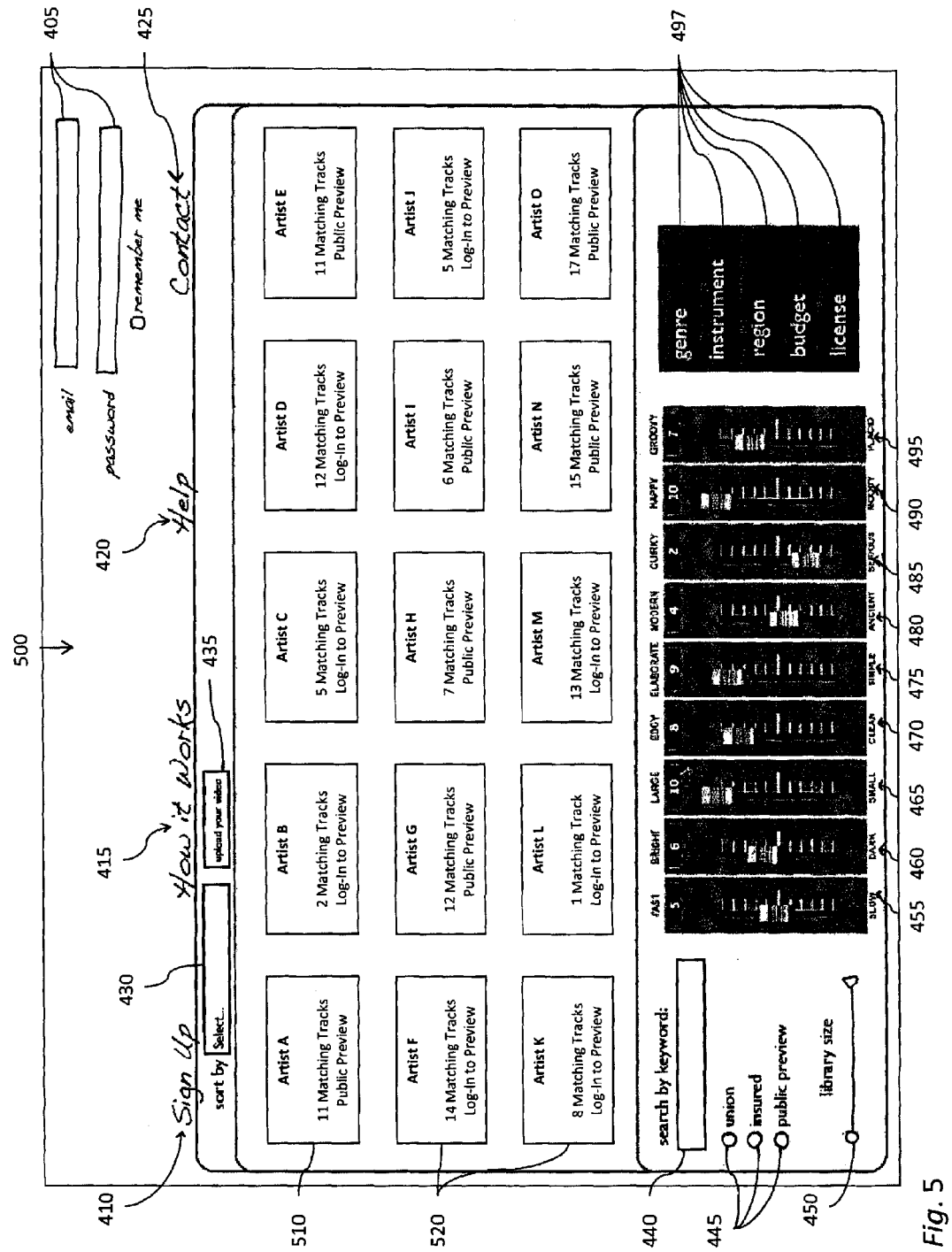
FIG. 5 is an example screenshot of a post-search screen and sliders according to the present invention.

FIG. 5 is an example screenshot of a post-search screen and sliders according to the present invention. Some elements of FIG. 5 are described above with respect to FIG. 4. Thus, same reference characters identify same or like components described above and any repetitive detailed description thereof will hereinafter be omitted or simplified in order to avoid complication.

A screen 500 displays sample search results from an execution of a search via at least sliders 455-495. Screen 500 displays visual elements 510 and 520, which are search results.

Element 510 is a visual element corresponding to an availability of a public preview of the track corresponding to element 510. For example, a public preview is preview which can be clicked on and listened to without logging in via element 405.

Element 520 is a visual element corresponding to an unavailability of a public preview of the track corresponding to element 520. Thus, a user to whom screen 500 is shown may perform a login process via element 405 to preview the track.

In an example embodiment, element 510 is most relevant and is displayed in a top-left corner. In an alternative embodiment, in geographic region where right-to-left language is spoken, element 510 is most relevant and displayed in a top most right corner.

In an example embodiment, name of a performing artist or the copyright owner appears along with a number of tracks matching the requested search requested. The search results may be via filtered element 445, for example, such as whether a public preview is available of the track.

In an example embodiment, if a license of a track has been set by the copyright owner to be exclusive or a work for hire, then in order to prevent double selling of the track, the track will not appear in search results if the track has already been licensed.

Figure 6:
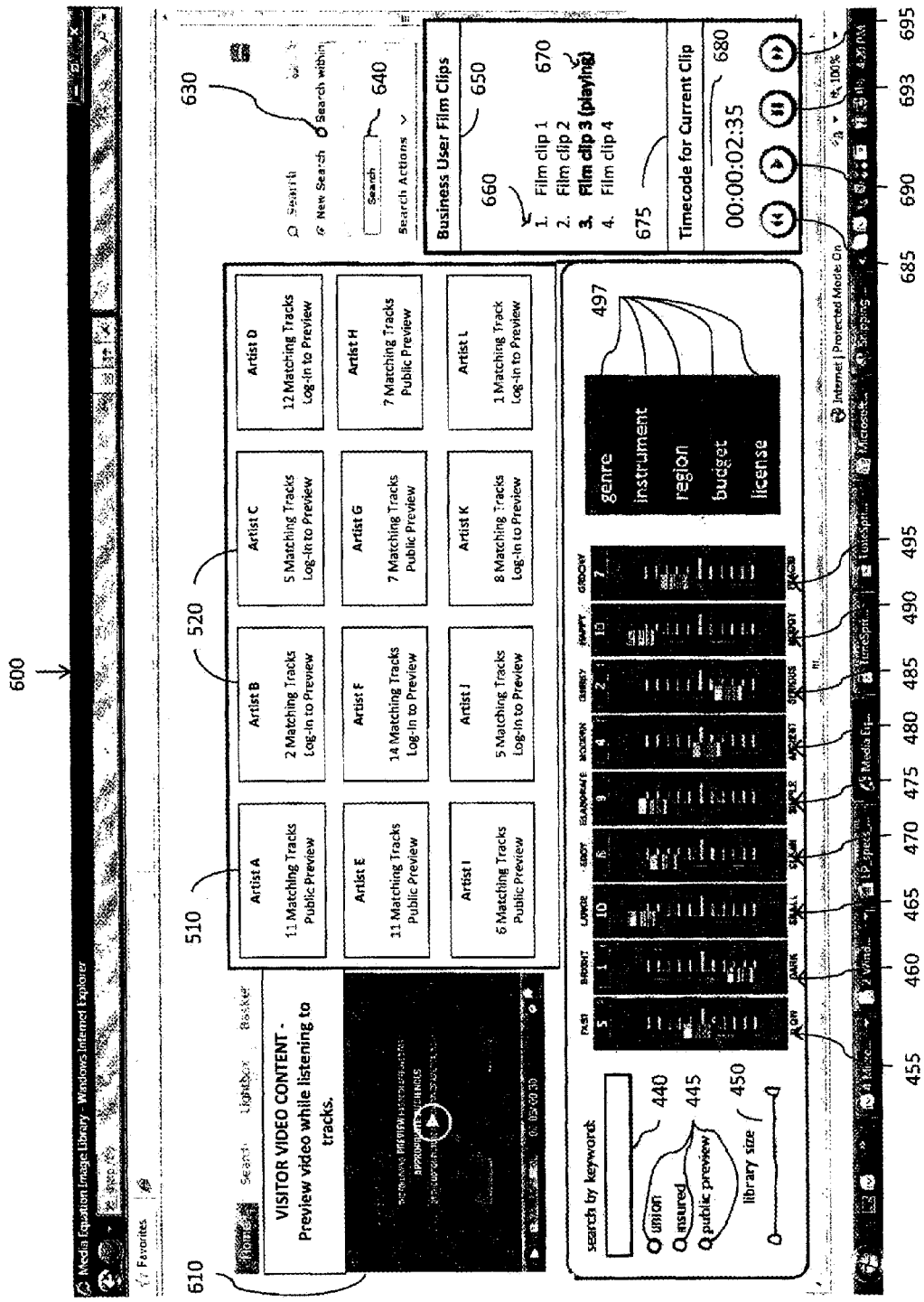
FIG. 6 is an example screenshot of a post-search screen displaying a user added video clip according to the present invention.

FIG. 6 is an example screenshot of a post-search screen displaying a user added video clip according to the invention. Some elements of FIG. 6 are described above with respect to FIG. 5. Thus, same reference characters identify same or like components described above and any repetitive detailed description thereof will hereinafter be omitted or simplified in order to avoid complication.

A screen 600 displays elements 610, 630-695.

Element 610 is a video display window, which displays a video clip uploaded by a user. The video clip, such a movie clip, a television clip or a videogame clip, may be uploaded by a business user.

Element 630 is a search choice element, which allows a new search or limits search to a search within search results as displayed by elements 510 and 520.

Element 640 is a search element, which upon clicking, initiates a search in accordance with element 630.

Element 650 is a business user video clip element, which displays a video clip listing 660 of all video clips uploaded by a user. A currently selected video clip element 670 is an element of video clip listing 660 and is visually distinct from other video clip listing 660 listings.

Element 675 is a time-code for current video clip element, which displays time-code 680 for a current video clip being played. For example, time-code format is hours:minutes:seconds:frames, as measured from 00:00:00:00 at a beginning of the current video clip. If the user desires to advance to a different section of the video clip, then the user can use reverse element 685, play element 690, pause element 693 or fast forward element 695 to make a desired selection. In an example embodiment, elements 650-695 aid a business user in matching a track to a video clip and making an appropriate selection of a track to license.

In one mode of operation, track auditioning is performed. A business user uploads a video clip, selects an audio track from the displayed search results and views the uploaded video clip while listening to the selected audio track. The currently playing video clip is displayed on a same screen as a detailed listing of search results obtained via adjustment of sliders 455-495.

In another mode of operation, mix and match auditioning is performed where the business user can adjust a starting and ending listening track point and a starting and ending video clip points in order to mix and match a portion of the audio track to play during a portion of the video clip, as selected by the user. Also, the business user can input a quote request if a user desires to use a portion of the track.

In an example embodiment, the mix and match auditioning can be performed with multiple tracks. For example, during play of any portion the video clip, the business user can play a first track from its beginning to its middle while playing a second track from its middle to its end. Alternatively, during play of any portion the video clip, the business user can automatically sequentially or randomly play any portion of any multiple tracks or adjust an audio characteristic, such as bass or treble, of the track.

Track auditioning and mix and match auditioning streamline the licensing process and allows the business user to make a relatively fast and simple decision on which track(s) is the most appropriate to be used as background music for the uploaded video clip.

Figure 7A:
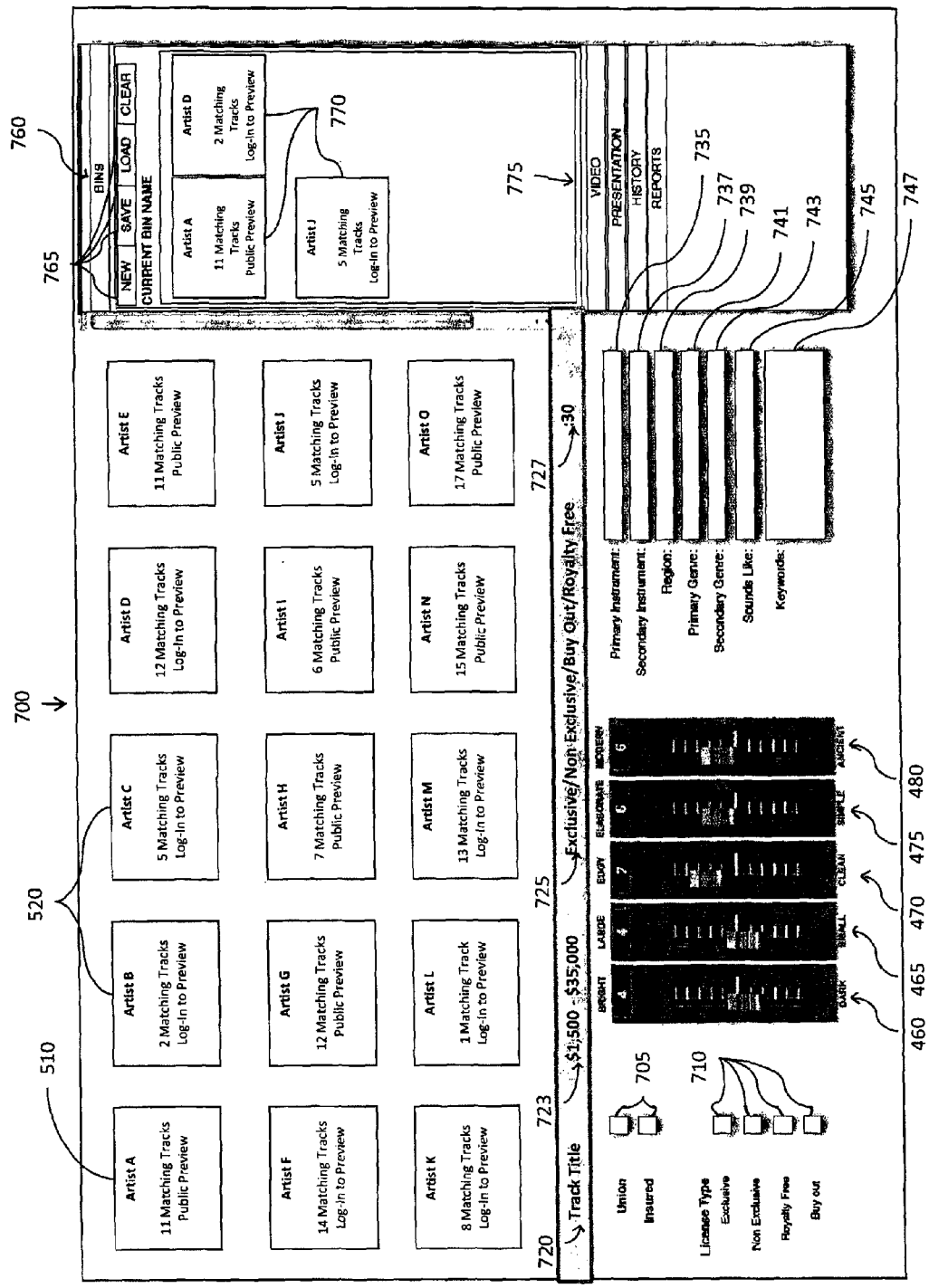
FIG. 7A is an example screenshot of a post-search screen with a window including an audio track for potential licensing according to the present invention.

FIG. 7A is an example screenshot of a post-search screen with a window including an audio track for potential licensing. Some elements of FIG. 7 are described above with respect to FIGS. 4-6. Thus, same reference characters identify same or like components described above and any repetitive detailed description thereof will hereinafter be omitted or simplified in order to avoid complication.

A screen 700 displays elements 705-775.

Element 705 is entity filter checkbox, which, when checked, indicates whether a performer of the audio track or the copyright owner is part of the musician's union or insured. Upon checking element 705, search results, such as elements 510 and 520, are instantly filtered to display updated search results corresponding to element 705.

Element 710 is a license type filter checkbox, which, when checked, indicates a license type, such as exclusive, non-exclusive, royalty free or rights buy-out possibility, offered by the copyright owner.

Element 720 is track title display element, which displays a title of a selected track.

Element 723 is a cost range display element, which displays a licensing cost range for track displayed via element 720.

Element 725 is a type of license available display element, which displays different types of license available for track displayed via element 720.

Element 727 is a track length element, which displays a track length for track displayed via element 720.

Element 735 is a dropdown menu filter, which, when clicked, provides a number of primary instrument options to filter by.

Element 737 is a dropdown menu filter, which, when clicked, provides a number of secondary instrument options to filter by.

Some examples of musical instruments displayed via elements 735 and 737 are illustrated in FIG. 7B.

Element 739 is a dropdown menu filter, which, when clicked, provides a number of geographic region options to filter by. Geographic region can be which the copyright owner or the artist are from or which geographic region is the track most associated with.

Element 741 is a dropdown menu filter, which, when clicked, provides a number of primary genre options to filter by.

Element 743 is a dropdown menu filter, which, when clicked, provides a number of secondary genre options to filter by.

Element 745 is a dropdown menu filter, which, when clicked, provides a number of sounds like genre options to filter by.

Element 747 is a dropdown menu filter, which, when clicked, provides a number of keyword options to filter by. Also, element 747 may be utilized to search for an artist name or a song title.

Element 760 is a bin element, which displays user selected tracks 770 for possible licensing.

Element 765 is a plurality of functions, which, alone or in combination, can be used to save a bin, load another bin, clear a bin or create a new bin.

Element 775 is dropdown element which allows for display or storage of video, presentations, history of licensing choices or reports.

In one mode of operation, a business user can click-and-drag potentially interesting track, such as corresponding to element 510, from a left side of screen 700 to element 760. The dragging process, in conjunction with information accessible via element 775, may be used in filtering among final selections or to save the selected tracks for later use if the business user elects to logout and desires to have the same tracks available when the user performs log-in at a later point in time.

In an example embodiment, a business user is able to functionally transmit the business user's bin to another business user's account with a track flagged for review or to grant an access privilege to another business user to access the business user's own bin.

FIG. 7B is an example chart of a listing of different musical instruments displayed in an element of a post-search screen according to the present invention.

Figure 8:
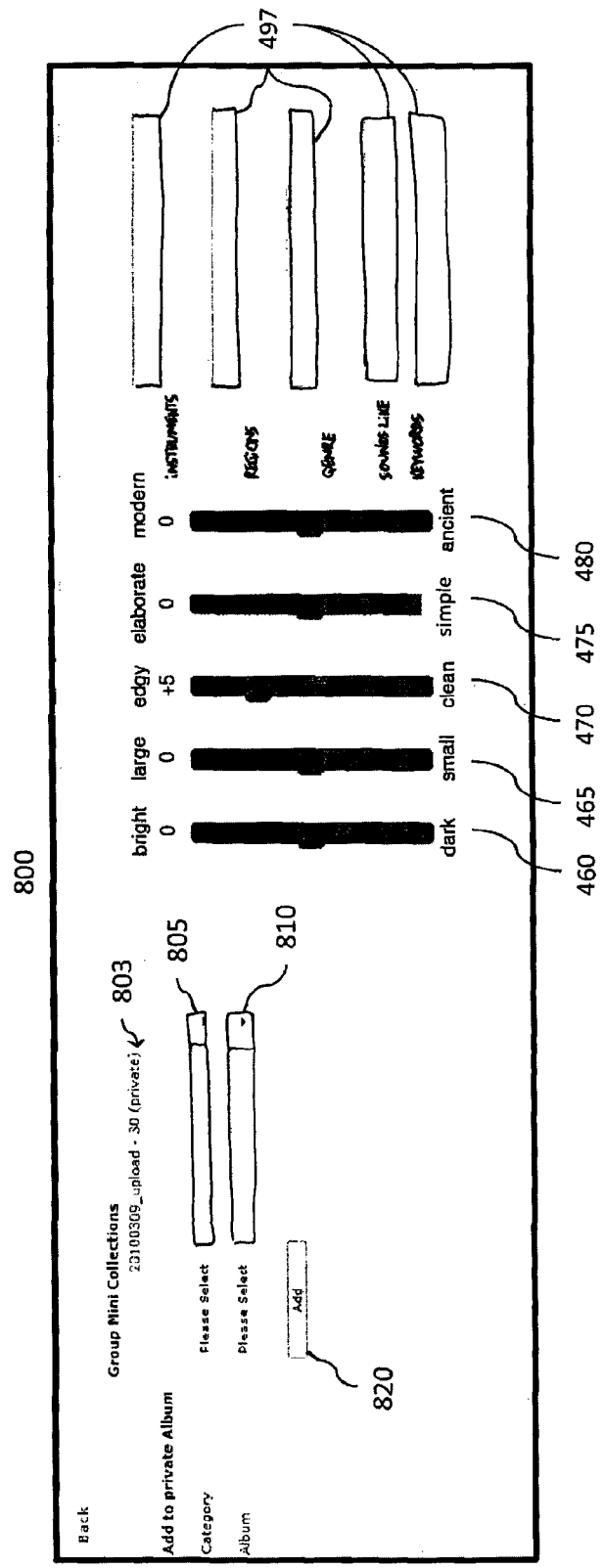
FIG. 8 is an example screenshot of an upload screen according to the present invention.

FIG. 8 is an example screenshot of an upload screen according to the present invention. Some elements of FIG. 8 are described above with respect to FIGS. 4-7B. Thus, same reference characters identify same or like components described above and any repetitive detailed description thereof will hereinafter be omitted or simplified in order to avoid complication.

Screen 800 displays elements 803-820.

Element 803 is an uploaded track element, which displays a name of a track uploaded or selected prior to upload by a copyright owner.

Element 805 is a category dropdown element, which displays a name of a category, such as rap, to which element 803 belongs to.

Element 810 is an album dropdown element, which displays a name of an album, to which element 803 belongs to.

The copyright owner can rate the track from a default sliders 460-480 positions via adjusting a position of each slider 460-480. In an example embodiment, the default rating can be provided at baseline (approximately midway through the height of the slider) or the default rating can be at one of five positions below baseline (0 through −5) or above baseline (0 through +5). The rating the copyright owner sets is saved as metadata and utilized later when a business user searches for relevant tracks.

Element 497 is similar as described above and element 497 allows the copyright owner to set metadata searchable features, such as an instrument used in making the track, a geographic region which the copyright owner or the artist are from or which geographic region is the track most associated with, a genre the track belongs to, what the track sounds like and a searchable keyword relating to the track.

Element 820 is an upload element, which, upon clicking, initiates upload of a track identified via element 803.

Figure 9:
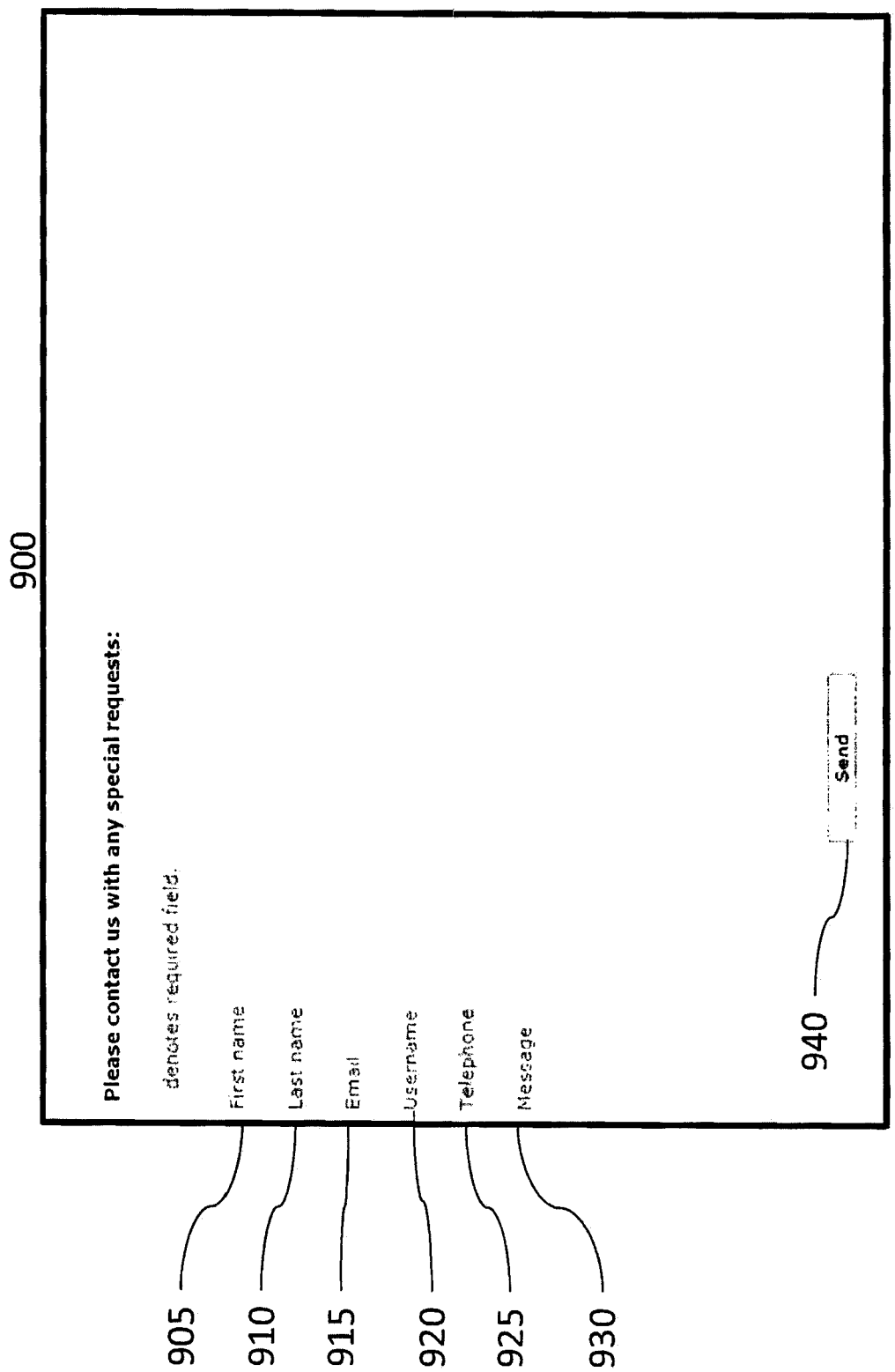
FIG. 9 is an example screenshot of a user feedback form according to the present invention.

FIG. 9 is an example screenshot of a user feedback form according to the present invention. A feedback form 900 includes elements 905-940. Feedback form is generally usable by a copyright owner or a business user to contact for any purpose an email address associated with clicking element 940.

Feedback form 900 is filled out by inputting a first name into first name element 905, a last name into last name element 910, an email address into email address element 915, a username into username element 920, a telephone number into telephone number element 925 and a message into message element 930. Next, upon clicking of element 940, feedback form 900 is submitted to an email address associated with clicking element 940.

Figure 10:
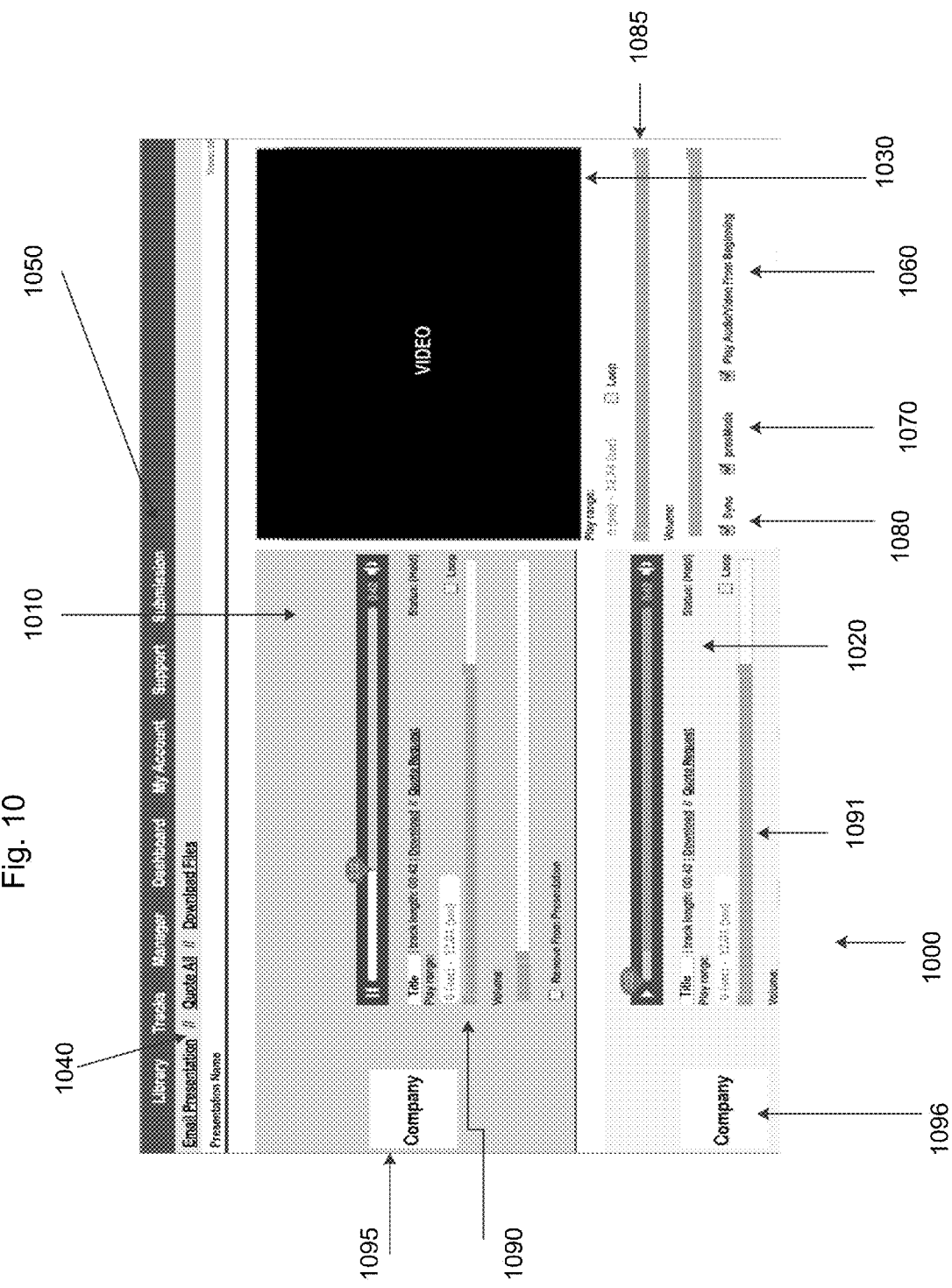
FIG. 10 is an example screenshot of a list of preferred tracks screen according to the present invention.

FIG. 10 is an example screenshot of a list of preferred tracks screen according to the present invention. A screenshot 1000 includes elements 1010-1050 and is shown from a perspective of a user creating the list.

Element 1010 is a first track element, which includes a first track control means. Element 1010 displays a first track progress bar to indicate a time progress of the first track and a first track volume bar to adjust playing volume of the first track. The volume adjustment via element 1010 can be independent of other tracks. Element 1010 also displays a first track time point customizer 1090, which allows a user to select a play range via a customized play time of the first track by selecting an audio starting time point and an audio ending point for the first track. Element 1010 also includes a copyright owner identifier 1095, such as a company name, an artist name or a band name.

Element 1020 is a second track element, which includes a second track control means. Element 1020 displays a second track progress bar to indicate a time progress of the second track and a second track volume bar to adjust playing volume of the second track. The volume adjustment via element 1020 can be independent of other tracks. Element 1020 also displays a second track time point customizer 1091, which allows a user to select a play range via a customized play time of the second track by selecting an audio starting time point and an audio ending point for the second track. Element 1020 also includes a copyright owner identifier 1096, such as a company name, an artist name or a band name.

Tracks referred to by elements 1010 and 1020 comprise a track list.

Element 1030 is a video element, which plays a user uploaded video clip or a presentation. Element 1030 includes a sync checkbox 1080, a presentation mode checkbox 1070 and a play from beginning checkbox 1060. While sync checkbox 1080 is selected, the playback of video clip is synchronized with which ever track is selected by the user. While presentation mode checkbox 1070 is selected, the tracks play in succession without interaction by the user. While play from beginning checkbox 1060 is selected, the audio tracks and the video clip start from the beginning of the selected "play range". If sync checkbox 1080, presentation mode checkbox 1070 and play from beginning checkbox 1060 are selected, then the user will just have to hit play on the first track, or on the video in order for all tracks to play, in order, while synchronized to the video.

In one mode of operation, a portion of the video clip displayed via element 1030 is auditioned against the first or the second track by adjusting the first track time point customizer and the second track time customizer. The tracks can be played sequentially or concurrently with the video clip. The volume bars of elements 1010 and 1020 can be adjusted independently or concurrently. Via play range element 1085, the video clip can be synchronized to always to start from a certain point when a next track is selected to be played. The video clip can be adjusted to loop. Also, functionality can be added to screen 1000 in order to allow a volume of the tracks referenced via elements 1010 and 1020 to fade in and fade out at the beginning and end of the audio or the video play range.

In an example embodiment, the user can adjust the in/out points of the audio via elements 1010 and 1020. The user can also adjust the in/out points of the audio via elements 1010 and 1020 and adjust the audio via elements 1010 and 1020 to correspond, in any customized way, to the video as referred by element 1030. The user can further change the in/out points of the video via element 1030 as to relatively consistently relate to each track played. The user can also adjust, via elements 1010 and 102, the audio volume of each track separately or concurrently. Via element 1030, the user can also adjust the volume of the audio which is played with the video (this volume remains consistent as each track of varying volume is played).

Element 1040 is a track action element, which allows the user to select an action relating to a track in the track list. Element 1040 allows the user to email the track list to any recipient. Element 1040 also allows the user to send a quote request for any or all tracks on the track list to the copyright owner, for example, if a user desires to use a portion of the track. Element 1040 also allows the user to download a track or all the tracks from the track list in a compressed format, such as a zipped format.

Element 1050 is a menu bar, which enables user access to a track library, tracks, manager, dashboard, user account, support information and submission.

In an example embodiment, implemented as shown in FIG. 10, audio and video are all separate pieces of media, being instructed in real-time by a computer system to synchronize together in a manner as selected by the user of the system.

Figure 11:
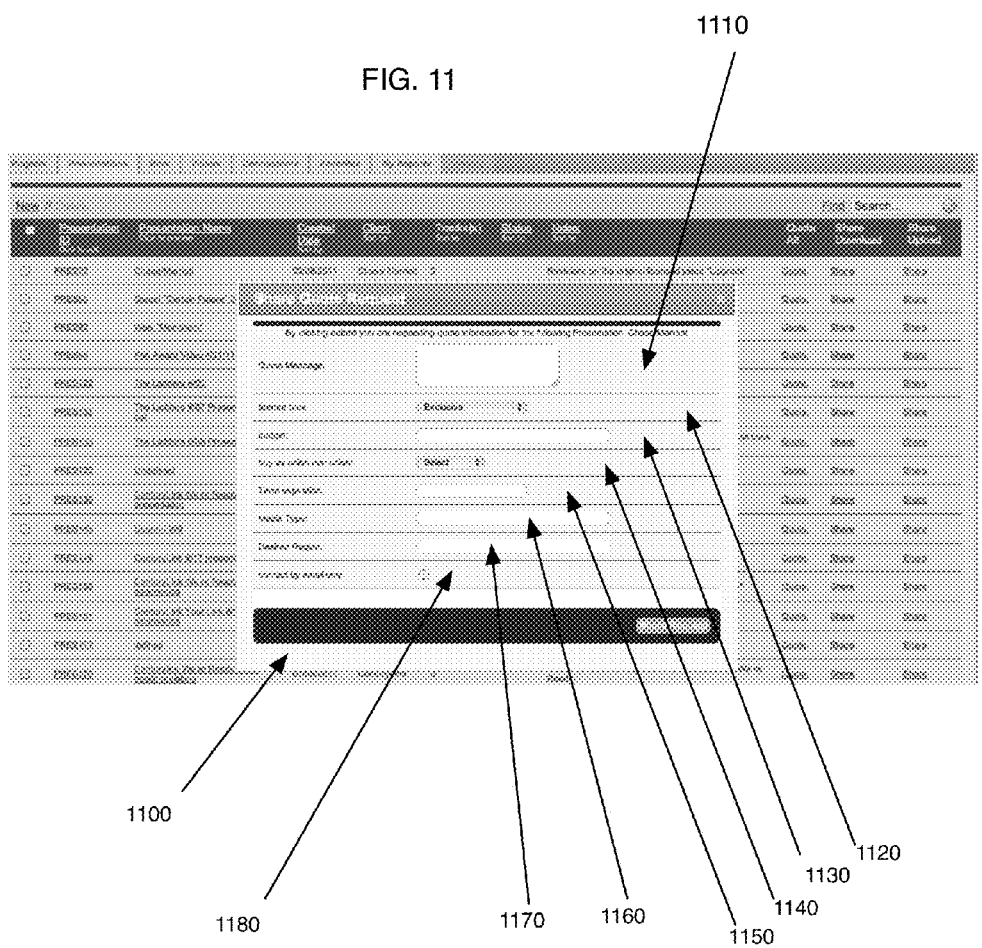
FIG. 11 is an example screenshot of a share quote request screen according to the present invention.

FIG. 11 is an example screenshot of a share quote request screen according to the present invention. A share quote request screen 1100 includes elements 1110-1180.

Element 1110 is a quote message element, which includes a field to enter textual message.

Element 1120 is a license type element, which allows selection of a license type, such as exclusive license.

Element 1130 is a budget element, which allows alphanumerical input corresponding to a requested budget.

Element 1140 is union element, which allows selection of a union or lack thereof.

Element 1150 is a term expiration element.

Element 1160 is an email only element, which allows a specification of contact by email only.

Element 1170 is a media type only element, which allows a specification of a media type.

Element 1180 is a desired region element, which allows specification of a geographic region associated with the track or a geographic region from which a performer is originally from.

In conclusion, herein is presented an the invention relates to a network-implemented information retrieval system, which allows one entity to upload an information file to a network server and another entity to retrieve the information file from the network server. The invention is illustrated by example in the drawing figures, and throughout the written description. It should be understood that numerous variations are possible, while adhering to the inventive concept. Such variations are contemplated as being a part of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method of searching for licensable audio content, the method comprising:
   accessing a network-implemented information retrieval system storing an audio file associated with a plurality of audio content characteristics, each of the characteristics having a first variable level set via a first visual indicator of the first level, the first indicator indicating at least one of a first increase and a first decrease in the first level by movement between a first pair of points with a first baseline located therebetween;
   inputting, into the system, a query including a second audio content characteristic variable level set via a second visual indicator of the second level, the second indicator indicating at least one of a second increase and a second decrease in the second level by movement between a second pair of points with a second baseline located therebetween;
   receiving a query result including a reference to preview the file, the file is associated with an access condition, the result based on matching of the second level with at least one of the first levels according to respective audio content characteristics; and
   previewing the file via selecting the reference.

2. The method of claim 1, further comprising downloading the file upon consenting to the access condition, wherein the access condition includes a licensing condition, at least one of the first and the second visual indicators includes at least one of a slider and a rotatable knob, the file has metadata corresponding to the file, the metadata includes the characteristics, at least one of the characteristics is at least one of an audio content mood and an audio content time style.

3. The method of claim 1, wherein one of the characteristics is an audio content speed, the second pair of points including a first point and a second point, the first point indicates fast speed, the second point indicates slow speed, the second baseline indicates moderate speed, the previewing includes playing a portion of the file concurrently with a portion of an uploaded sequence of still images representing scenes in motion.

4. The method of claim 3, wherein the previewing further includes playing a portion of a second audio file concurrently with the portion of the uploaded sequence, the second file audibly different from the file.

5. The method of claim 4, wherein the portion of the file and the portion of the second file are played concurrently.

6. The method of claim 2, wherein the previewing includes playing a plurality of portions of the file concurrently with a portion of an uploaded sequence of still images representing scenes in motion.

7. A computer-implemented method of facilitating file retrieval via a network-implemented information retrieval system, the method comprising:
   storing an audio file on the system, the file associated with a plurality of audio content characteristics, each of the characteristics having a first variable level, the first level is set via a first visual indicator of the first level, the first indicator indicating at least one of a first increase and a first decrease in the first level by movement between a first pair of points with a first baseline located therebetween, the file is associated with an access condition for the file;
   receiving a query including a second audio content characteristic variable level, the second level is set via a second visual indicator of the second level, the second indicator indicating at least one of a second increase and a second decrease in the second level by movement between a second pair of points with a second baseline therebetween; and
   outputting a query result including a reference to the file if the second level matches with at least one of the first levels according to respective audio content characteristics.

8. The method of claim 7, further comprising outputting a stream of a first portion of the file upon a preview request received via a selection of the reference, wherein the access condition includes a licensing condition, at least one of the first and the second visual indicators includes at least one of a slider and a rotatable knob, the file having metadata for the characteristics, at least one of the characteristics is at least one of an audio content mood and an audio content time style.

9. The method of claim 7, further comprising at least one of receiving payment account data as consent to the access condition and charging a previously stored payment account data as consent to the access condition offering the file for downloading upon payment, one of the characteristics is an audio content speed.

10. The method of claim 8, wherein the characteristics include at least one of an audio content mood and an audio content time style.

11. The method of claim 10, wherein the outputting includes streaming the first portion of the file while concurrently playing a portion of stored sequence of still images representing scenes in motion.

12. A method of searching for audio content, said method comprising:
   via a computer system:
      providing a first plurality of sliders to a first user, said first sliders configured to set a first plurality of variable levels for a first plurality of audio content characteristics;
      receiving a first input from said first user, said first input is via said first sliders, said first input is for an audio file selected by said first user;
      associating said first input with said file;
      providing a second plurality of sliders to a second user, said second sliders configured to set a second plurality of variable levels for a second plurality of audio content characteristics;
      receiving a second input from said second user, said second input is via said second sliders;
      providing a reference to said second user when said second input at least partially matches said first input according to respective audio content characteristics, said reference referring to said file.

13. The method of claim 12, further comprising:
facilitating said file being licensed to said second user according to a licensing condition set by said first user, said facilitating based on said providing said reference.

14. The method of claim 12, further comprising:
facilitating preview of said file against a recording of moving visual images, said facilitating based on said providing said reference, said recording provided via said second user.

15. The method of claim 14, further comprising:
receiving an audio starting time point and an audio ending time point from said second user for said file;
receiving a video starting time point and a video ending time point from said second user for said recording;
wherein said facilitating based on playing said file according to said audio starting point and said audio ending point while playing said recording according to said video starting point and said video ending point.

16. A method of searching for audio content, said method comprising:
via a computer system:
providing a first graphical user interface to a first user, said first interface including a first means for gradually selecting at least one of a first increase and a first decrease in a first plurality of variable levels for a first plurality of audio content characteristics;
receiving a first input from said first user, said first input is via said first means, said first input is for an audio file selected by said first user;
associating said first input with said file;
providing a second graphical user interface to a second user, said second interface including a second means for gradually selecting at least one of a second increase and a second decrease in a second plurality of variable levels for a second plurality of audio content characteristics;
receiving a second input from said second user, said second input is via said second means;
providing a reference to said second user when said second input at least partially matches said first input according to respective audio content characteristics, said reference referring to said file.

17. The method of claim 16, further comprising:
facilitating said file being licensed to said second user according to a licensing condition set by said first user, said facilitating based on said providing said reference.

18. The method of claim 16, further comprising:
facilitating preview of said file against a recording of moving visual images, said facilitating based on said providing said reference, said recording provided via said second user.

19. The method of claim 18, further comprising:
receiving an audio starting time point and an audio ending time point from said second user for said file;
receiving a video starting time point and a video ending time point from said second user for said recording;
wherein said facilitating based on playing said file according to said audio starting point and said audio ending point while playing said recording according to said video starting point and said video ending point.

\* \* \* \* \*